Dec. 6, 1966  J. WIDREWITZ ET AL  3,289,930
INTERFERENCE PREDICTION CALCULATOR
Filed Jan. 4, 1966  2 Sheets-Sheet 1

INVENTORS
JULIUS WIDREWITZ
HOLLIS J. HEWITT
BY Harry A. Herbert Jr
Charles H. Wagner
ATTORNEYS Dec. 6, 1966  J. WIDREWITZ ETAL  3,289,930
INTERFERENCE PREDICTION CALCULATOR
Filed Jan. 4, 1966  2 Sheets-Sheet 2
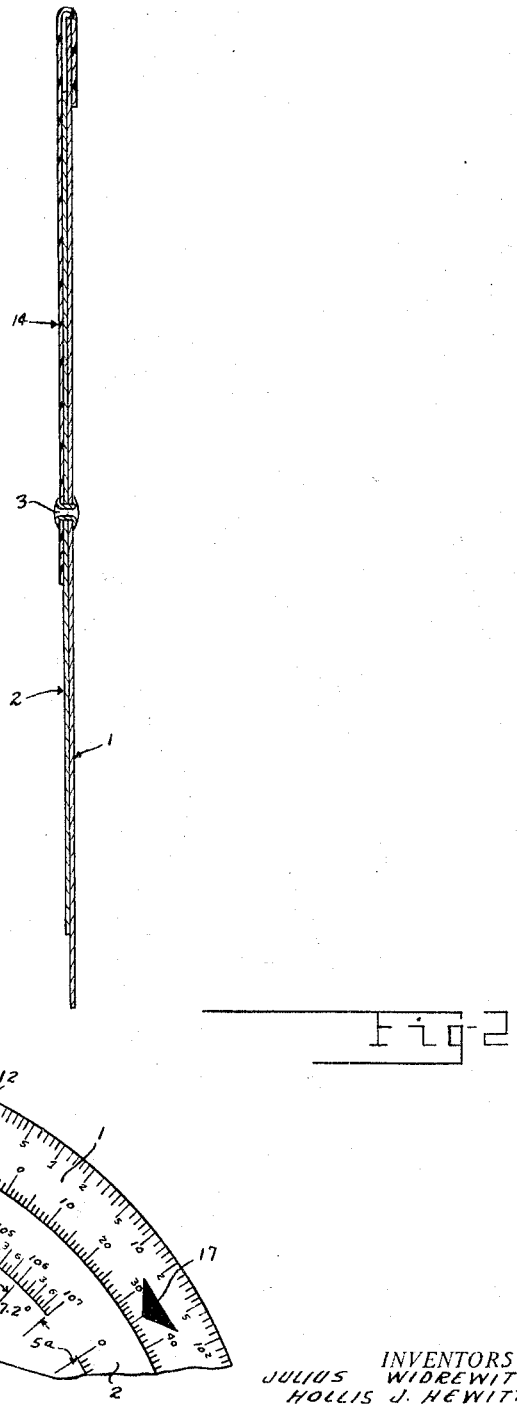
INVENTORS
JULIUS WIDREWITZ
HOLLIS J. HEWITT
BY Harry A. Herbert Jr.
Charles H. Wagner
ATTORNEYS 8,289,930
INTERFERENCE PREDICTION CALCULATOR
Julius Widrewitz, Utica, and Hollie J. Hewitt, Rome, N.Y.; said Hewitt assignor to the United States of America as represented by the Secretary of the Air Force
Filed Jan. 4, 1966, Ser. No. 518,741
9 Claims. (Cl. 235—88)

The invention described herein may be manufactured and used by or for the United States Government for governmental purposes without the payment to me of any royalty thereon.

This invention relates to calculators, and more particularly to mechanical calculators used to assist in determining levels of interference in radio transmitters and receivers, having for an object the provision of a simple hand-held manually operable device for predicting the probability of interference involving known parameters such as transmitter power, transmitter antenna gain, receiver antenna gain, receiver sensitivity, transmitter antenna coupling, propagation loss (distance and frequency), receiver coupling.

A further object is the provision of a simple radio intereference margin and power density calculator, preferably in the form of two superimposed concentric, rotatively adjustable circular discs with a transparent concentrically pivoted hairline adjustable alignment guide, in which the various parameters, such as transmitter power (watts), transmitter antenna gain (db), receiver antenna gain (db), receiver sensitivity (dbm), transmitter antenna coupling (db), propagation loss [distance (miles and feet), frequency (mcs.)], and receiver coupling (db) are disposed in the form of circular successive, indicia scales spaced concentrically around the outer portion of the upper one of the discs, and a concentric circular correlated power density (dbm/m.$^2$) and interference margin (db) indicia scale arranged on the lower disc around the periphery of the upper disc, with the transparent hairline alignment guide disposed for successive registrations with predetermined interference parameter values on the several spaced indicia scales on the upper disc and the power density and interference margin indicia scale, for determining power density or interference margin on the power density and interference margin indicia scale by predetermined progressive rotative adjustments between said upper disc spaced indicia scales and said alignment guide relative to said interference margin and power density scale indicia.

A further object of the invention is the provision of means to perform the conversion to a common unit quickly and automatically, and sums the various separate interference parameter values to provide a calculator and process to predict results, such as power density (dbm/m.$^2$), and field strength (volts/meter) for a variety of antennas which are fixed at any relative orientation, and for a fixed number of transmitters operating simultaneously.

A further object is the provision of a manually operable disc type calculator with correlated statistical radio interference data around the perimeter whereby predictions can be made and combined into a common format adequate for handling quickly and easily, without further computations, general problems, such as power density (dbm/m.$^2$), interference margin (db), and field strength (volts/meter), that one would normally encounter in the field to which the invention is applicable.

A further object is the provision of mechanical means to extract and tabulate constants for each equipment and system performance sufficient to provide constants which define and sequentially add all of the input information required to determine the probabilities of radio type interference.

A further object is the provision of a manually manipulatable calculator means making it possible to tabulate signal values from emitters which may produce unsatisfactory levels of interference.

Other objects and advantages of the invention will become apparent from the following description and accompanying drawings in which like characters refer to like parts in the several figures.

*Drawings*

FIG. 2 is a transverse sectional view through the indicator, taken about on line 2—2 of FIG. 1.

FIG. 3 is a fragmentary view showing a portion of the discs when set initially to start the solving for a determination of field strength (volts/meter) and power density (dbm/m.$^2$).

Figure 1:
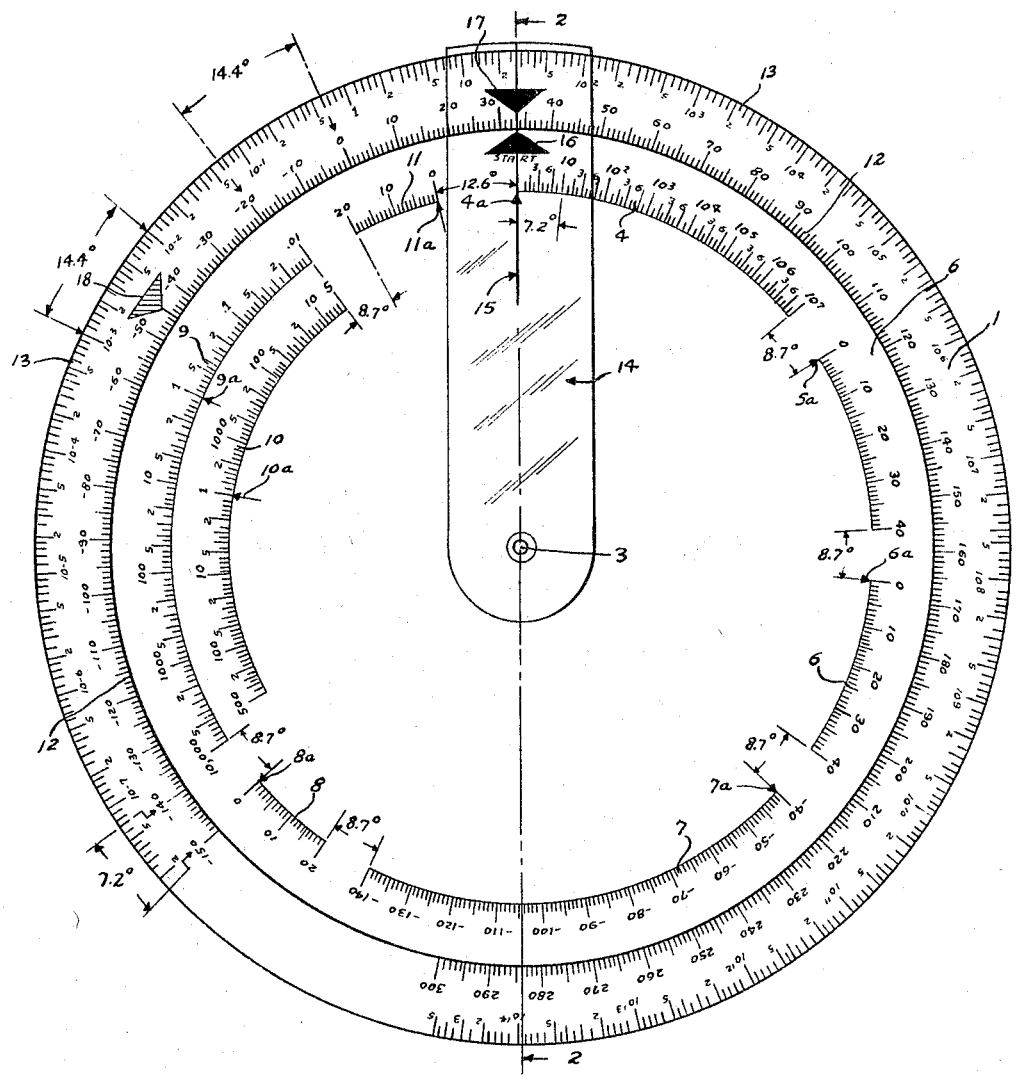
FIG. 1 is a plane view of the interference prediction calculator invention with the upper and lower indicia discs and the transparent hairline indicator set for the beginning of a calculation for predicting interference margin (db).

Referring to FIGS. 1 and 2, in particular, the interference margin, power density and field strength calculator consists of lower disc 1 indicating interference margin and field strength, and an upper smaller disc 2 is provided with a plurality of circumferentially spaced concentric scales, each having predetermined interference value indicia, namely a transmitter power (watts) indicia scale 4, a transmitter antenna gain (db) indicia scale 5, receiver antenna gain (db) indicia scale 6, receiver sensitivity (dbm) scale 7, a transmitter antenna coupling (db) scale 8, frequency (mcs.) propagation loss scale 9, distance (miles and feet) propagation loss scale 10, and a receiver coupling (db) scale 11. These scales cover the indicia determining values necessary for interference margin, power density and field strength when properly and preferably progressively adjusted relative to one of the other circular power density (dbm/m.$^2$) indicia scale 12 on the lower disc 1 immediately surrounding the periphery of the upper disc 2, or to the field strength scale 13 extending concentrically around the periphery of the lower disc 1 outside of the interference margin indicia scale 12.

The reference numeral 14 denotes a transparent hairline indicator arm (or disc) concentrically pivoted at 3 which carries a hairline 15 adjustable with the indicator 14 to selectively or progressively register with the selected predetermined interference indicia on the indicia scales 4 to 11 and the desired selected indicia scale 12 or 13, depending upon whether it is desired to determine interference margin (db) or power density (dbm/m.$^2$) or field strength (volts/meter).

The calculations are usually initiated by aligning the start arrow or pointer 16 with a pointer or arrow 17 on the lower disc 1, the arrow 17 hereinafter also referred to as the black arrow, and is used in the case of determining interference margin, or aligning the start arrow 16 with a second pointer or arrow 18, also on the peripheral exposed portion of the lower disc 1, also hereinafter referred to as the blue arrow or pointer and used in determining field strength (volts/meter) and power density (dbm/m.$^2$).

In connection with the layout of the upper disc 2 the radial angle for each decade of propagation loss on the propagation loss frequency indicia scale 9 is equal to 14.4 degrees and for losses between successive decades, the chord distance is given by the equation:

Chord distance=radius[2—2 cos (14.4 log. prop. loss)]$^{1/2}$

The radial angle for each decade of transmitter power (indicia scale 4) is equal to 7.2 degrees. For values between successive decades, the chord distance is given by the equation:

$$\text{Chord distance} = \text{radius}[2 - 2\cos(7.2 \log. \text{trans. power})]^{1/2}$$

The radial angle for each decade of the remaining elements or scales 4, 5, 6, 7, 8 and 12 is equal to 7.2 degrees. For values between successive decades, the chord distance is given by the equation:

$$\text{Chord distance} = \text{radius}(2 - 2\cos .72 \text{ db})^{1/2}$$

The radial angle for the spacing between the receiver coupling (indicia scale 11) and transmitter power (indicia scale 4) is 12.6 degrees. The radial spacing between each of the other indicia scales 4, 5, 6, 7, 8, 9, 10, and 11 is 8.7 degrees.

The power density indicia scale (also the interference margin) 12 is obtained by using 7.2 degrees for each decade, while the values between successive decades of the power density-interference margin indicia scale 12 is obtained by using the formula:

$$\text{Chord distance} = \text{radius}(2 - 2\cos .72 \text{ db})^{1/2}$$

The outermost field strength (volts/meter) indicia log. scale 13 is obtained by using 14.4 degrees for each decade.

The scales 4, 9 and 10 on the upper disc 2, and the outermost field strength (volts/meter) indicia scale 13 around the lower disc 1 are log. scales, while the others are not.

Each of the scales on the upper disc 2 have an initial or starting point which is indicated by the respective arrows 4a, 5a, 6a, 7a, 8a, 9a, 10a, and 11a (for the respective scales 4, 5, 6, 7, 8, 9, 10 and 11) the arrow 4a for the transmitter power indicia scale 4 being in radial alignment with the black start triangle or pointer 16.

It should be noted that the propagation loss (frequency mcs.) indicia scale 9 extends counter-clockwise from the arrow 9a for values greater than one and clockwise from the arrow 9a for decimal values less than one. The distance scale 10 extends counter-clockwise from the arrow 10a for distance values in miles, and clockwise from the arrow for distances in feet (less than one mile).

The other indicia scales 4, 5, and 6 increase in values in a clockwise direction from their respective arrows 4a, 5a and 6a, while direction from the arrow 7a (from —40 dbm to —140 dbm).

The transmitter antenna coupling and receiver coupling scales 8 and 11 increase in values in a counter-clockwise direction from their respective arrows 8a and 11a.

The inner power density (dbm/m.²) and interference margin (db) scale 12 values increase from 0 in a clockwise direction to 300, with the black arrow 16 located at 33. This scale 12 is also decreasing in a counter-clockwise direction from 0 to —150 with the blue arrow or triangle 18 located at —45.

The outer or field strength log. scale 13 extends from 1 in a clockwise direction to $5 \times 10^{14}$, and from the 1 in the counter-clockwise direction to $2 \times 10^{-8}$ volts/meter, with the blue arrow 18 located at $3.4 \times 10^{-3}$ volts/meter. The black and blue arrows 17 and 18 are set to take into account constants contained in the conversion formulas.

The alignment guide 14 is provided for setting a determined initial point value on the outer circle disc 1 and is used for each scale element's start position.

The calculator operates by first converting each element to a common unit (db or dbm), and second by adding contributions of each element algebraically, to obtain a resultant interference margin, power density or volts per meter indication or determination.

In describing the use or manipulation of the calculator to determine radio interference margin, on scale 12, in the following assumed example, the operation thereof follows:

Transmitter power (watts)=1000 watts (on scale 4)
Transmitter antenna gain (db)=10 db (on scale 5)
Receiver antenna gain (db)=5 db (on scale 6)
Receiver sensitivity (dbm)=80 dbm (on scale 7)
Transmitter antenna coupling (db)=0 (on scale 8)
Frequency (mcs.)=1 mc. (on scale 9)
Distance (miles and feet)=1 mile (on scale 10)
Receiver coupling (db)=9 (on scale 11)
Answer=Interference margin (db)=118 db (on scale 12)

To determine the interference margin the start pointer 16 is first aligned with the black arrow 17. The hairline indicator 14 is then moved to 1000 watts on the scale 4 (or to $10^3$). Next the upper disc 2 is rotated (without moving the hairline) to the arrow 5a on the transmitter antenna gain scale 5. Next the disc 2 is again rotated with the hairline on disc 1 held stationary, to 10 db on transmitter antenna gain scale 5. The hairline is again moved, without relative movement between the discs 1 and 2, to the arrow 6a on the receiver antenna gain scale 6. The upper and lower discs are again held fixed while the hairline 15 is moved to 5 db on the receiver antenna gain scale 6. The upper disc is again rotated relative to the hairline 15 to bring the arrow 7a for the next succeeding (receiver sensitivity, dbm) scale 7, after which the discs 1 and 2 are held fixed while the hairline indicator 14 is rotated to align the hairline 15 with the arrow 7a on the receiver sensitivity (dbm) scale 7. The hairline 15 is next advanced to —80 dbm on the scale 7, then the hairline indicator 14 and lower disc 1 are held against relative movement while the upper disc 2 is again rotated to bring the next arrow 8a on the scale 8 under the hairline 15. Since the transmitter antenna coupling on scale 8 is indicated at 0, the disc 2 is further rotated to bring the next arrow 9a on the frequency (mcs.) scale 9 uder the hairline, and since the arrow 9a and the frequency given in the Example 1 coincide, also the distance given (1 mile), and arrow 10a on scale 10 coincide, and the receiver coupling (db) on scale 11 is given as 0 and the arrow 11a coincide these scales can be disregarded in this example and the interference margin is directly indicated under the hairline 15 on interference margin (db) scale 12, as 118 db.

Tabulated below are three other examples besides the one given above for determining interference margin which may be calculated by successive actuations of the upper disc 2 and hairline indicator 14, as indicated above.

| To Determine Interference Margin Start Black Arrow 17 | Examples | | | |
|---|---|---|---|---|
| | 1 | 2 | 3 | 4 |
| Transmitter Power (watts) (Scale 4) | 1,000 | 10,000 | 500 | 250 |
| Transmitter Antenna Gain (db) (Scale 5) | 10 | 15 | 5 | 10 |
| Receiver Antenna Gain (db) (Scale 6) | 5 | 15 | 10 | 15 |
| Receiver Sensitivity (dbm) (Scale 7) | —80 | —60 | —40 | —45 |
| Transmitter-Antenna Coupling (db) (Scale 8) | 0 | 5 | 20 | 15 |
| Frequency Propagation Loss (mcs.) (Scale 9) | 1 | 1.5 | 5.0 | 20 |
| Distance Propagation Loss (miles) (Scale 10) | 1 | 1.5 | 2 | 2.5 |
| Receiver Coupling (db) (Scale 11) | 0 | 10 | 5 | 15 |
| Answer= Interference Margin (db) (Scale 12) | 118 | 101 | 91 | 23 |

In all examples the interference parameters given are successively added (or subtracted) relative to the interference margin scale 12 and the result (interference margin) for the conditions specified are read directly off the scale 12.

Tabulated below are several examples of conditions where it is desired to determine (field strength) on the outer field strength (volts/meter) indicia scale 13 on the larger disc 1, or power density (dbm/m.$^2$), indicia scale 12.

EXAMPLES TO DETERMINE FIELD STRENGTH IN VOLTS/METER OR POWER DENSITY (dbm/m.$^2$)

[Start Blue Pointer 18]

| | | | | |
|---|---|---|---|---|
| Transmitter Power (watts) (Scale 4) | 500 | 1,500 | 10,000 | 1,000 |
| Transmitter Antenna Gain (db) (Scale 5) | 20 | 15 | 5 | 10 |
| Distance (feet) (Scale 10) | 1,000 | 500 | 100 | 10 |
| Answer= | | | | |
| Volts/Meter (Scale 13) | 4.04 | 8.5 | 13.6 | 200 |
| Power Density (dbm/m.$^2$) (Scale 12) | 11.5 | 23 | 35.5 | 50 |

In explaining the operation to determine the field strength or power density for the first example tabulated the blue arrow 18 is first aligned with the start arrow or pointer 16 and the hairline indicator is then moved to 500 watts on the transmitter power (watts) scale 4. Next the upper disc 2 is adjusted to bring the arrow 5a on the scale 5 directly under the hairline. Then hairline is advanced to 20 db on the scale 5. The upper disc is then adjusted without moving the hairline to bring the arrow 10a under the hairline, and the hairline then advanced along the distance scale 10 to 1000 feet, and the field strength indicated on the outer scale 13, under the hairline 15, which determines the field strength (4.04 volts/meter) or power density indicated on the scale 12, which determines the power density (11.5 dbm/m.$^2$) for this example. Similar manipulation of the disc and hairline indicator will determine the field strength or power densty for the other examples given.

Since the field strength determining indicia scale 13 extends in a clockwise direction from 0 for positive values, and in a counter-clockwise direction for negative values it may be desirable to distinctively color these scales, for instance red for the positive portion of the scale and blue for the negative portion of the scale.

In conclusion, it should be observed that the various interference parameters indicated on the interference indicia scales 4, 5, 6, 7, 8, 9, 10 and 11 are preferably successively added, or subtracted (in the case of the scales 7, 8, 9, 10 and 11) as the hairline on the indicator is moved along either of the two scales 12 or 13 on the lower disc 1 to quickly determine the answer.

While the calculator is shown and described in connection with a circular or disc type device it should be readily apparent that the scales 4 to 11 could be disposed in progressively similarly spaced longitudinal relation along a straight calculator on the slide stick of a conventional slide rule type of calculator with the two field strength and power density and interference margin indicia scales similarly disposed along the elongated body, and the inclusion of a hairline indicator which is slidable along the longitudinal body for successive registrations with the arrows located similar to the arrows 4a to 11a on the selected interference perimeter values on the scales (similar to the arrows on the scales 4 to 11), and the resultant field strength or interference margin values can be directly read and determined directly by progressively and alternately manipulating the slide and the hairline indicator on the device.

For purposes of exemplification a particular embodiment of the invention has been shown and described to the best understanding thereof. However, it will be apparent that changes and modifications in the arrangement and construction of the parts thereof may be resorted to without departing from the true spirit and scope of the invention as defined in the following claims.

We claim:

1. A radio interference prediction calculator comprising first and second relatively adjustable interference prediction indicia members having adjacent edges with cooperating interference prediction indicia thereon, a cursor movable thereon having a hairline for simultaneous registration with predetermined selected indicia on both of said relatively adjustable members, said second member having a plurality of different interference parameter value indicia scales disposed thereon in successively spaced relation along the edge thereof adjacent the edge of said first member, said first member having a correlated power density (dbm/m.$^2$) and interference margin (db) value indicia scale thereon extending continuously along the edge thereof adjacent all of said successively spaced different interference parameter value indicia scales of said second member, whereby predetermined interference values on said interference perimeter indicia scales are combined by predetermined alternate cooperative adjustments between said first and second indicia scales and said cursor to indicate the radio interference and power density prediction on said power density and interference margin indicia scale on the first member under said hairline in alignment with the final successively selected interference parameter value indicia on said successively spaced interference perimeter scales on said second member.

2. A radio interference prediction device comprising first and second relatively adjustable interference prediction indicia carrying members having adjacent edges with uniformly spaced adjacent cooperating predetermined interference prediction and field strength determining indicia thereon, a transparent alignment indicator adjustable along said edges having a hairline thereon for simultaneous registering alignment with predetermined selected indicia on both of said adjacent edges, said second member indicia comprising a plurality of different predetermined interference parameter value indicia scales thereon disposed in successively predetermined spaced relation to each other along the edge thereof, adjacent said adjacent edge of said first member, comprising a predetermined transmitter power (watts) perimeter indicia scale, a predetermined transmitter antenna gain (db) perimeter indicia scale, a predetermined receiver antenna gain (db) perimeter indicia scale, a predetermined receiver sensitivity (dbm) perimeter indicia scale, a predetermined transmitter antenna coupling (db) perimeter indicia scale, a predetermined propagation loss, frequency (mcs.) perimeter indicia scale, a predetermined propagation loss, distance in miles and feet perimeter indicia scale, and a predetermined receiver coupling (db) perimeter indicia scale, said second member having a correlated power density (dbm/m.$^2$) and interference margin (db) determining indicia scale thereon extending without interruption along the edge thereof in correlated relation adjacent all of said successively spaced different predetermined interference perimeter value indicia scales on said second member, whereby upon predetermined registering progressive adjustments between the substantially continuous scale indicia on said first member and progressively selected indicia on the several scales on the second member with said hairline of said indicator in alignment therewith disposes said hairline in registration with indicia on said field strength, power density and interference margin scales for indicating field strength, power density and interference margin on the indicia on said first member.

3. An interference prediction device comprising a first member having thereon an elongated predicted interference indicia scale, a second member adapted to be progressively moved relative to said first member having thereon a plurality of indicia scales for different interrelated interference parameters, with at least certain of said scales disposed in spaced relation along with the direction of movement of said second member opposite said elongated interference prediction scale to progressively register with predetermined indicia on said plurality of indicia scales to indicate predetermined predicted interference indicia on said elongated interference prediction indicia scale on said first member.

4. An interference prediction device as set forth in claim 3 including a cursor selectively and progressively movable along said scales relative said first member to progressively register with predetermined indicia on said second member to indicate predetermined predicted interference indicia on said elongated interference prediction indicia scale on said first member.

5. A radio interference prediction device as set forth in claim 4 in which said first and second members comprise, first and smaller second concentrically pivoted adjustable circular disc members with the elongated predicted interference indicia scale extending substantially around the circumference of the first disc member thereof adjacent the periphery of the second smaller disc member, and said plurality of spaced different interrelated interference perimeter indicia scales are disposed in predetermined concentric circumferentially spaced relation around the peripheral portion of the second smaller disc member immediately adjacent and opposite the elongated interference prediction scale on the first disc member, with said cursor concentrically pivoted for rotative adjustment around the center of said first and smaller second disc members, having a radial hairline thereon disposed for successive registrations with predetermined interference perimeter indicia in the several scales on the second smaller disc member, and progressive radial registration of said hairline with indicia on said elongated interference prediction indicia scale on peripheral portion of the larger first disc member.

6. A radio interference prediction calculator device comprising a pair of concentrically pivoted relatively adjustable lower larger and upper smaller correlated interference prediction indicia carrying discs, and a transparent cursor pivoted for angular swinging adjustments around a central pivot for said discs, said cursor having a hairline extending radially across said correlated interference prediction indicia on the peripheral portions of both of said discs, an adjacent concentric field strength (volts/meter) log. scale extending substantially entirely around and adjacent the periphery of said lower disc in a clockwise direction from 1 to substantially $10^{14}$ values greater than unity and in a counter-clockwise direction from 1 to $10^{-7}$ for values less than unity on which the decades thereof equal 14.4 degrees, a field strength start initiating pointer for determining predicted field strength (volts/meter) disposed at $10^{-3}+.0025$ $(=.0035)$ on said field strength scale, a start indicating pointer on said upper disc for initial registration with the aforesaid field strength pointer in determining predicted field strength, a transmitter power (watts) log. indicia scale extending clockwise from said start initiating pointer to $10^7$ watts on said scale in which each decade thereof equals 7.2 degrees, a numerical circumferentially spaced transmitter antenna gain (db) indicia scale having indicia extending clockwise from zero to 40 (db) spaced 8.2 degrees clockwise from said transmitter power (watts) scale in which each decade thereof equals 7.2 degrees, a circumferentially spaced receiver antenna gain (db) numerical scale having indicia extending clockwise from zero to 40 db, spaced clockwise 8.2 degrees from the preceding transmitter antenna gain (db) scale, in which each decade thereof equals 7.2 degrees, a receiver sensitivity (dbm) numerical indicia-scale circumferentially spaced clockwise 8.2 degrees from the preceding receiver antenna gain (db) scale and having indicia extending clockwise from $-40$ to $-140$ (dbm) in which each decade thereof equals 7.2 degrees, a numerical transmitter antenna coupling indicia scale spaced 8.2 degrees clockwise from the preceding receiver sensitivity (dbm) indicia scale, decreasing clockwise from 20 to 0, in which each decade thereof equals 7.2 degrees, a propagation loss-frequency (mcs.) log. scale spaced clockwise 8.2 degrees from the preceding transmitter antenna coupling indicia scale, decreasing clockwise from 10,000 mcs. to .01 mcs. in which each decade thereof equals 14.4 degrees, a numerical receiver coupling (db) indicia scale spaced 8.2 degrees clockwise from the aforesaid propagation loss, frequency (mcs.) indicia log. scale, decreasing clockwise from 20 to 0 db with each decade thereof equal to 7.2 degrees, and propagation loss distance in feet and miles log. indicia scale disposed in inwardly spaced concentric opposite adjacent relation to the aforesaid propagation loss, frequency (mcs.) indicia scale, spaced 8.7 degrees counter-clockwise from said receiver coupling (db) indicia scale and extending counter-clockwise from 5 feet to 500 miles, in which each decade thereof equals 14.4 degrees.

7. A radio interference prediction calculator device as set forth in claim 6 including a concentric numerical power density ($dbm/m.^2$) and interference margin (db) prediction indicia scale on said lower larger disc member extending substantially around said central pivot in inward uniformly spaced relation to the aforesaid field strength (volts/meter) log. indicia scale extending from zero in a clockwise direction to 300 $dbm/m.^2$ and from said last mentioned zero in a counter-clockwise direction to $-150$ $dbm/m.^2$ in which each decade thereof equals 7.2 degrees and having an initial start arrow for predicting power density ($dbm/m.^2$) and interference margin (db) disposed for initial registration with unity on the several scales on said upper smaller disc, said initial start arrow located clockwise from zero on said power density ($dbm/m.^2$) and interference margin (db) scale at 33.

8. A radio interference margin, power density and field strength prediction determining device comprising a pair of concentrically pivoted relatively adjustable lower larger and upper smaller correlated power density interference margin field strength and radio interference parameter value indicia carrying indicia thereon, and a transparent cursor concentrically pivoted thereon having a radial hairline thereon for selective registration with the aforesaid indicia, said indicia comprising a concentric field strength (volts/meter) prediction indicia (volts/meter) log. scale extending from unity clockwise around its periphery to at least $10^{14}$ and from said unity counter-clockwise to at least $10^{-7}$ in which each decade of said scale equals 14.4 degrees, an initial start pointer thereon disposed at $10^{-3}+.0025$ $(=.0035)$, a second interference margin, power density concentric numerical scale extending from zero in a clockwise direction to at least 300 db and in a counter-clockwise direction from said zero to at least 150 with each decade thereof equal to 7.2 degrees, an initial start pointer for the last scale located thereon in a clockwise direction from zero at 33, said lower disc having an initial starting arrow thereon for selective registration with either of the aforesaid start pointer or initial start pointer, said perimeter value indicia scales extending in counter-clockwise circumferentially spaced concentric relation around the peripheral portion of said upper disc from said initial start pointer spaced 8.2 degrees from each other, comprising a transmitter power (watts) log. scale graduated clockwise from 0 to $10^7$, a numerical transmitter antenna gain (db) indicia increasing clockwise from 0 to 40 db, a receiver antenna gain (db) numerical scale increasing clockwise from 0 to 40 db, a receiver sensitivity (dbm) indicia scale decreasing clockwise from $-40$ dbm to $-140$ dbm, a transmitter antenna coupling scale (db) decreasing clockwise from 20 to 0, a propagation loss frequency (mcs.) indicia log. scale decreasing clockwise from 10,000 mcs. to .01 mcs., a receiver coupling (db) numerical scale decreasing clockwise from 20 db to 0 db, and propagation loss distance in miles and feet log. indicia scale decreasing clockwise from 500 miles to 5 feet disposed in adjacent inwardly spaced concentric relation to said propagation loss frequency (mcs.) indicia with the lowest indicia value of the last mentioned two log. scales disposed in radial alignment, the decades in the log. indicia of said propagation loss frequency (mcs.), said propagation loss distance in miles and feet indicia scale and said field strength (volts/meter) scales disposed in 14.4 degree angular relations, the decades of all of the remaining regular indicia scales and said power density (dbm/m.) interference margin (db) scale being equal to 7.2 degrees.

9. In a computer as set forth in claim 8, an arrow disposed on each of said interference perimeter value scales on said upper smaller at the zero or lowest unit indicia on said transmitter power, transmitter antenna gain, receiver antenna gain receiver sensitivity, transmitter coupling and propagation loss, frequency scales, and at the unitary lowest mile unit on said distance in miles and feet indicia log. scale for registration of said hairline of said cursor during rotative adjustments of said upper second disc indicia relative to the surrounding field strength and power density interference margin indicia on said lower first disc.

References Cited by the Examiner

UNITED STATES PATENTS 3,050,249  8/1962  Awramik et al. _____ 235—78
3,232,531  2/1966  Hodge _____ 235—78 X RICHARD B. WILKINSON, *Primary Examiner.*